United States Patent
Chaupit

[15] 3,654,542

[45] Apr. 4, 1972

[54] DEVICE FOR SIMULTANEOUSLY CONTROLLING INTERCONNECT SEMICONDUCTOR ARRANGEMENTS

[72] Inventor: Jean Chaupit, Fontenay-Aux-Roses, France

[73] Assignee: Compagnie Generale D'Electricite, Paris, France

[22] Filed: May 28, 1970

[21] Appl. No.: 41,301

[30] Foreign Application Priority Data

May 29, 1969 France ................................6917613
June 27, 1969 France ................................6921832

[52] U.S. Cl. ........................................321/27 R, 307/252 L
[51] Int. Cl. ........................................................H02m 7/00
[58] Field of Search ...................307/83, 252.54; 321/11, 13, 321/27; 323/23, 44, 48, 49

[56] References Cited

UNITED STATES PATENTS

| | | | |
|---|---|---|---|
| 3,502,910 | 3/1970 | Johanson-Brown | 307/252 L |
| 3,526,824 | 9/1970 | Leowald | 321/27 X |
| 3,267,290 | 8/1966 | Diebold | 321/11 ux |
| 3,334,289 | 8/1967 | Chumakov | 323/49 X |
| 3,521,145 | 7/1970 | Toulemonde et al. | 321/27 |

*Primary Examiner*—William M. Shoop, Jr.
*Attorney*—Craig, Antonelli & Hill

[57] ABSTRACT

The control of semiconductor elements is ensured by a sinusoidal signal generator supplying control circuits adjusted to the frequency of the said generator. The control of a great number of elements in series is ensured by means of a cascade of transformers each having a secondary winding which is used as a signal source.

15 Claims, 11 Drawing Figures

Patented April 4, 1972 3,654,542

5 Sheets-Sheet 1

Patented April 4, 1972 3,654,542

5 Sheets-Sheet 4

DEVICE FOR SIMULTANEOUSLY CONTROLLING INTERCONNECT SEMICONDUCTOR ARRANGEMENTS

The present invention concerns an arrangement for controlling the operation of an assembly of semi-conductor devices, and particularly a series, parallel, or series-parallel connected assembly of transistors or thyristors.

It is well known to construct series connected assemblies of thyristors, such as when very high voltages are employed and particularly, but not exclusively, in direct current power transmission applications. It is equally well known to use chains of capacitors and resistors to divide a voltage between the thyristors of such an assembly.

In applications requiring the use of a larger number of thyristors connected in series, making up what is often referred to as a chain or column, it is necessary to divide this column in several identical sections, each composed of several thyristors connected in series. The control of thyristors then poses certain problems, particularly that of obtaining simultaneous firing of all the thyristors. French Pat. No. 1,521,349 describes a device for the control of such combinations of thyristors, making use of a generator supplying a series of transformers, each transformer controlling one section of thyristors. The control of the thyristors of one section can be carried out in various ways: one is described in French Pat. No. 1,521,349 and involves providing on the transformer associated with each section a number of secondary windings equal to the number of thyristors making up the section. Another approach is described in French Pat. No. 1,463,915, in which each transformer fires the thyristor operating at the lowest voltage in each section, the firing of the other thyristors of the section then taking place in succession until all are fired.

A disadvantage of this progressive firing of the thyristors in a section is that only a small number of the thyristors are fired simultaneously. The first thyristors of all sections fire simultaneously, then a little later, the second thyristors of all sections fire simultaneously, and so on.

The first mentioned proposal, involving the use of multiple secondary windings on each section transformer introduces an undesirable coupling between the control arrangements of the different thyristors.

Failure of one thyristor of the section can adversely affect the others. Furthermore, in high power installations, it is necessary to take precautions against interference signals which might provoke the untimely firing of the thyristors.

One application of parallel connected assemblies of transistors occurs in the amplification of high frequency signals. Where the amplification is to produce high output powers, it is often necessary to operate a number of transistors in parallel, each carrying only part of the total output power. It is not only necessary to take account in such applications of variations in the transistor parameters, but also the variations in the length of the interconnections between them and particularly of the connections supplying control signals. These can introduce stray capacitances and inductances capable of causing an appreciable phase shift in the control signals between the different transistors, with resulting differences in the control currents which can lead to overloads on the transistors.

It is thus necessary to provide a significant degree of feedback for each transistor which, in reducing the gain, reduces the likelihood of overloads. This feedback involves a reduction in the available power at the outputs of the transistors.

In accordance with the invention, an arrangement for controlling the operation of a series, parallel, or series-parallel connected assembly of semi-conductor devices comprises a generator for providing control signals at a predetermined control frequency, and a general control circuit supplied with the control signals by the generator and being at least in part tuned to the predetermined control frequency, the general control circuit being arranged to supply the control signals simultaneously to all the semi-conductor devices connected to that part of the general control circuit tuned to the predetermined control frequency.

The predetermined control frequency is preferably one of a range of predetermined control frequencies at each of which the generator can produce control signals.

Where the assembly of semi-conductor devices comprises a number of sub-assemblies, the general control circuit suitably includes a control circuit associated with each sub-assembly, each sub-assembly control circuit being tuned to the or a predetermined control frequency and arranged to apply a control signal from the generator and at the frequency to which it is tuned simultaneously to all the semi-conductor devices of the associated sub-assembly.

The general control circuit suitably comprises a series connected cascade of section transformers, a primary winding of the first section transformer being connected to the generator to receive the control signals and primary windings of successive section transformers of the cascade being connected to the secondary winding of the preceding section transformer, so that all section transformers receive the control signal, one section transformer being associated with each sub-assembly and connected to the control circuit of that sub-assembly. Each sub-assembly control circuit save one then suitably includes a control transformer, an electric cable threading the magnetic circuit of the control transformer, and a capacitance connected in series with the cable, the secondary winding of the associated section transformer and the primary winding of the succeeding section transformer, said one sub-assembly control circuit being that associated with the final section transformer of the cascade and which includes a control transformer, an electric cable threading the magnetic circuit of the control transformer and a capacitance connected in series with the cable and the secondary winding of the final section transformer of the cascade.

Alternatively, each sub-assembly control circuit includes a control transformer, an electric cable threading the magnetic circuit of the control transformer and a capacitance, the cable and capacitance being connected in parallel with the secondary winding of the associated section transformer.

In another alternative, each sub-assembly control circuit includes a control transformer, an electric cable threading the magnetic circuit of the control transformer and a capacitance, the cable and capacitance being connected in series and in series with the cables and capacitances of all other sub-assembly control circuits across the generator output to constitute the general control circuit.

The invention will now be described in more detail, by way of examples only, with reference to the accompanying diagramatic drawings, in which:

FIG. 1 shows a series connected assembly of thyristors divided into *n* sub-assemblies each including *m* thyristors, with associated control circuitry;

FIG. 2*a* shows part of the circuitry of FIG. 1 in more detail;

FIG. 2*b* shows an alternative version of the circuitry shown in FIG. 2*a;*

Figure 6A:
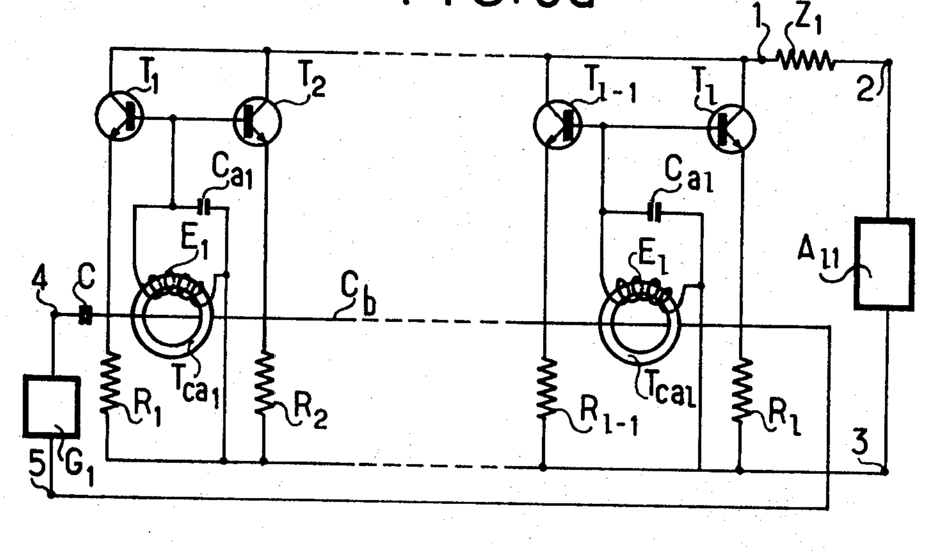
Figure 6B:
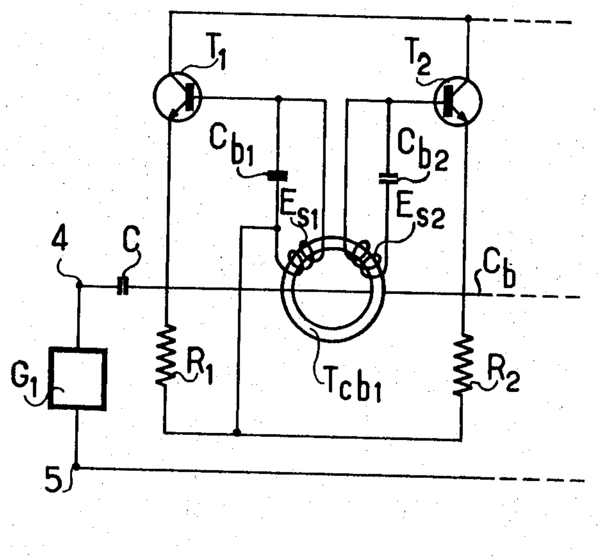

FIG. b a shows a parallel connected assembly of transistors with associated control circuitry;

FIG. 6*b* shows a modification of the circuitry of FIG. 6*a;*

Figure 6C:
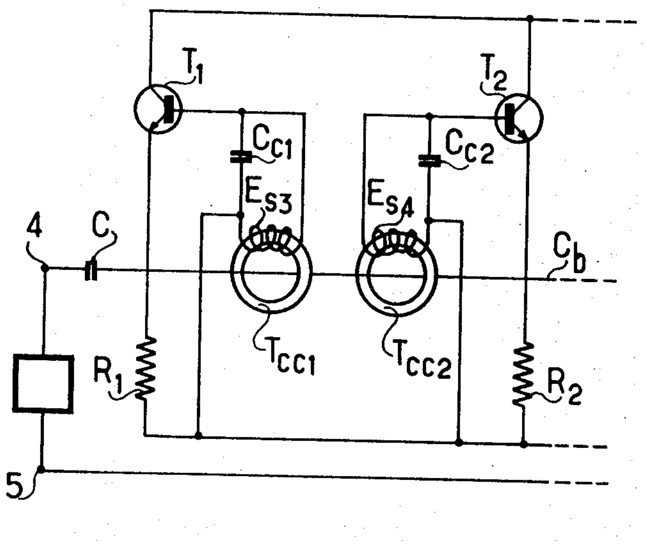

FIG. 6*c* shows a further modification of the circuitry shown in FIG. 6*a;*

Figure 7:
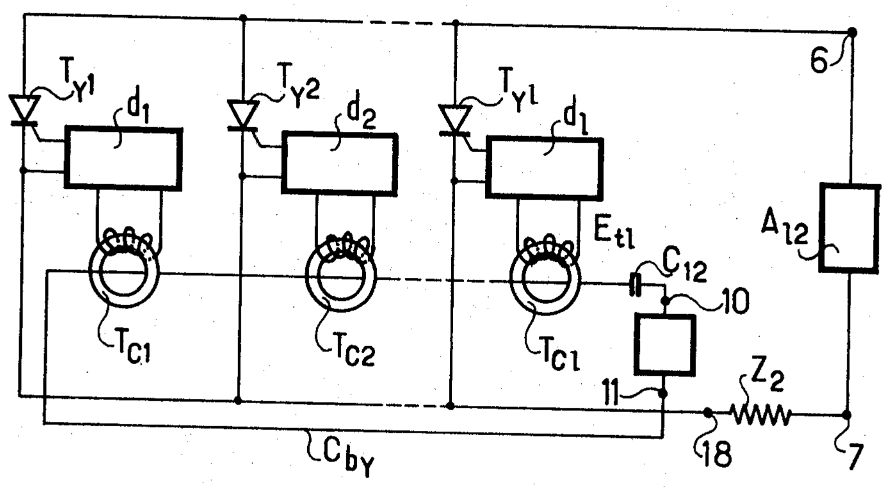
Figure 8:
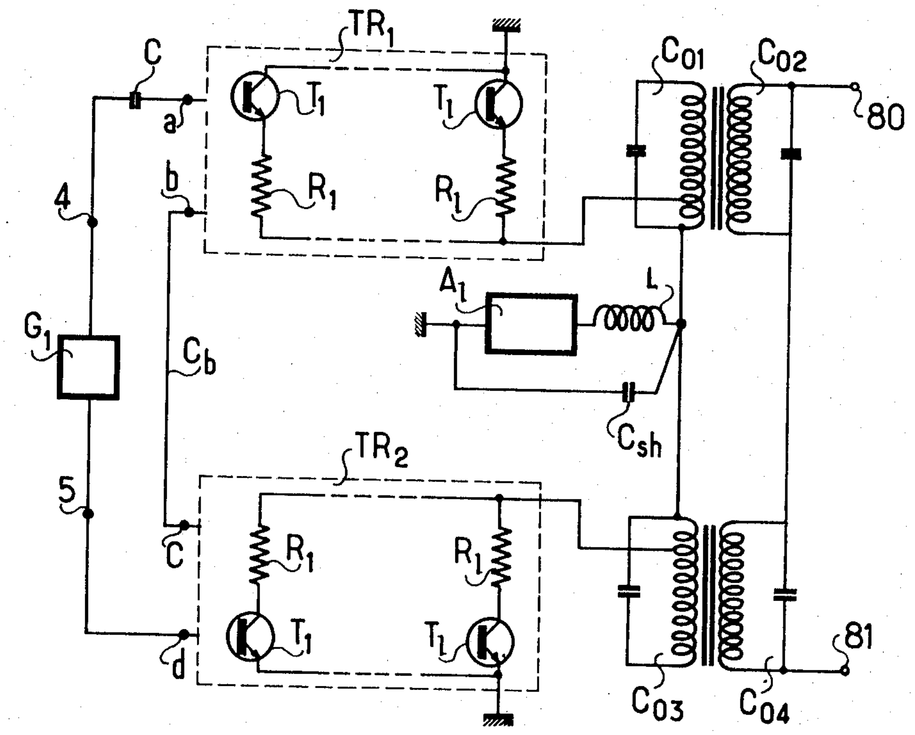

FIG. 7 shows a parallel connected assembly of thyristors with associated control circuitry; and FIG. 8 shows a series-parallel connected assembly of transistors with associated control circuitry.

Figure 1:
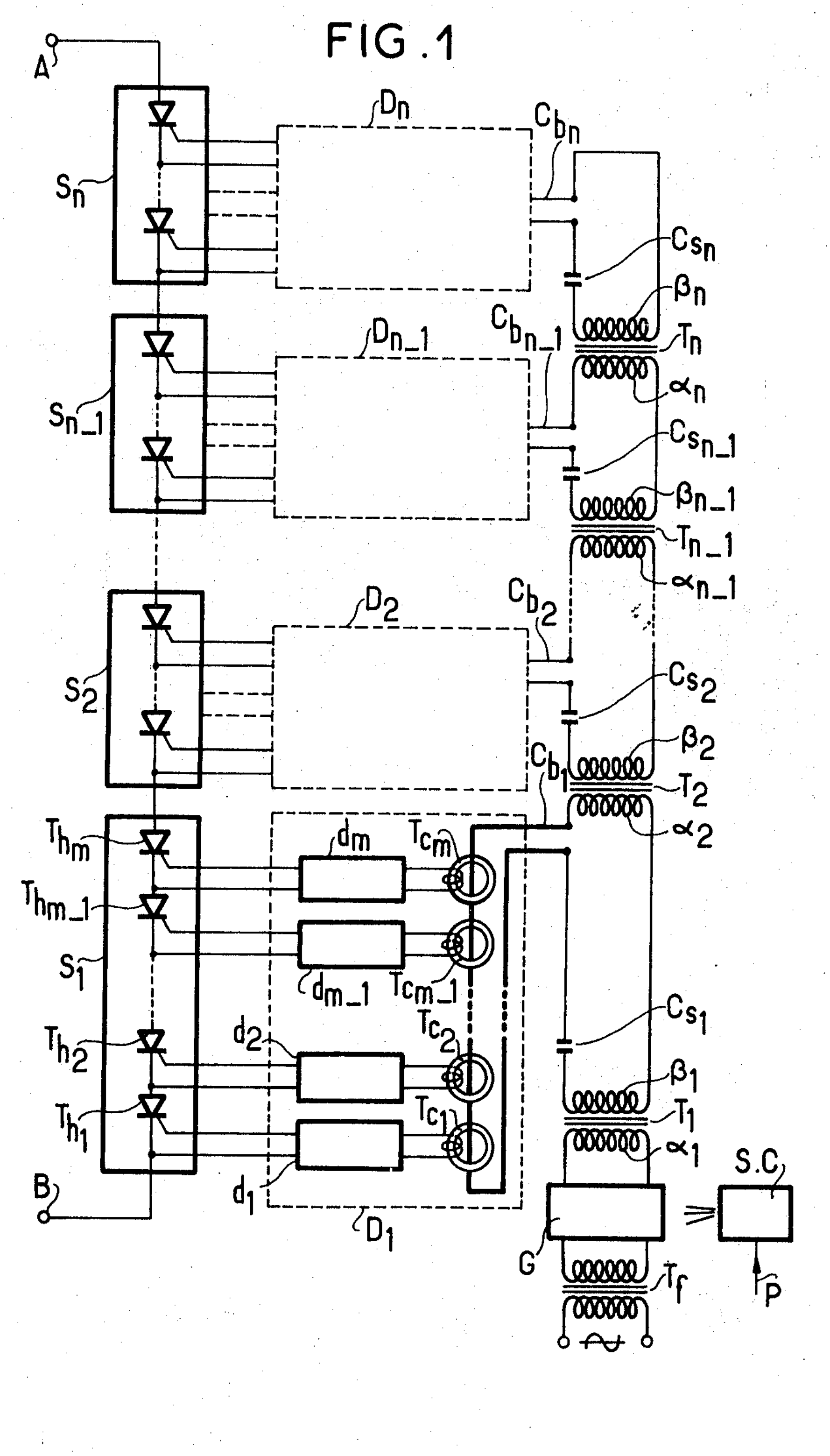

Referring to FIG. 1, the series connected assembly or column of thyristors is connected between supply terminals A and B. The *n* sub-assemblies $S_1$ to $S_n$ each include m thyristors $Th_1$ to $Th_m$. The entire column thus comprises *mn* thyristors.

Each sub-assembly or section S is associated with a corresponding section transformer T, section transformers $T_1$ to $T_n$ being associated with sections $S_1$ to $S_n$ respectively. The transformers T are connected in cascade, the secondary winding of each transformer being connected to the primary winding of the succeeding transformer. With each section S is also associated a cable Cb and a capacitance Cs. Cables $Cb_1$ to $Cb_n$ and capacitances $Cs_1$ to $Cs_n$ are associated with sections $S_1$ to $S_n$ respectively. Each cable Cb is connected in series with the associated capacitance Cs the secondary winding of the associated transformer T, and the primary winding of the next transformer in the cascade. Each cable Cb is well insulated electrically.

Each section S is connected to a corresponding thyristor control module D, modules $D_1$ to $D_n$ being associated with sections $S_1$ to $S_n$ respectively. Each module D comprises $m$ rectifier circuits d, the outputs of circuits $D_1$ to $D_n$ being connected between cathode and gate of thyristors $Th_1$ to $Th_m$ respectively.

The input of each rectifier circuit D is connected to the secondary winding of a respective control transformer Tc, transformers $Tc_1$ to $Tc_m$ being connected to rectifier circuits $d_1$ to $d_m$ respectively.

In FIG. 1, only module $D_1$ has been shown in detail, the remaining modules $D_2$ to Dn being identical to it.

The magnetic circuits of the control transformers Tc of each section S are threaded by the corresponding cable Cb. The module D, cable Cb and capacitance Cs of each section S constitute a sub-assembly control circuit for that section.

The primary winding $\alpha_1$ of section transformer $T_1$ is connected to the output of a generator G providing high frequency control signals which are generally sinusoidal. The generator G is connected to an alternating current supply through an isolating transformer $T_f$. The generator G suitably comprises a quartz controlled oscillator or a resistance-capacitance oscillator together with a modulator and an amplifier.

The generator G is connected to a control source SC through a suitable isolating arrangement. This arrangement could consist of an isolating pulse transformer feeding pulses from the control source SC to the generator G, but in the present example, the isolation is obtained by an electro-magnetic connection between the source and the generator. The modulator of the generator includes an element for picking up control pulses from the source SC, and where the connection is by means of optical radiation, this element suitably consists of a photo-electric cell. A high frequency control signal can be applied by the generator G to the first section transformer $T_1$ during a period defined by successive pulses from the source SC. The short pulses required are suitably provided by a flash lamp or an electroluminescent cell in the source SC.

The secondary winding $B_1$ of the first section transformer $T_1$ is connected in series with the primary winding $\alpha_2$ of the second section transformer $T_2$, with the cable $Cb_1$, and with the capacitance $Cs_1$. The transformers T, cables Cb and capacitances Cs of successive sections of the cascade are similarly connected. The value of each capacitance Cs is so chosen that the circuit formed by the capacitance, the corresponding cable Cb and the two transformer windings is resonant at the frequency supplied by the generator. This permits control signals from the generator G to be transmitted through the control circuitry with minimal attenuation, and effects a considerable reduction in the susceptability of the circuitry to disturbances by stray signals and interference. The frequency supplied by the generator G is suitably between 0.1 and 10 MHz.

The cable $Cb_1$ threads the closed magnetic circuit of each of the control transformers $Tc_1$, $Tc_2$ . . . . $Tc_m$, each of which is constructed on a toroidal ferrite core. The high frequency signal obtained at the terminals of the secondary winding of each transformer Tc is applied to the input of the corresponding rectifier circuit D.

Figure 2A:
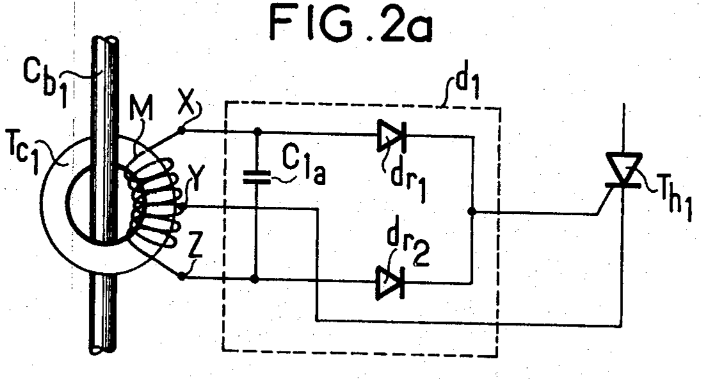

FIG. 2a shows a first form of rectifier circuit D, more particularly circuit $D_1$. The cable $Cb_1$ threads the magnetic circuit of control transformer $Tc_1$ which has a secondary winding M. The ends of the winding XZ are connected to the anodes of respective semi-conductor rectifier diodes $dr_1$ and $dr_2$. The terminals X and Y are shunted by a capacitance $C_1a$. A center tap Y of the winding M is connected to the cathode of the associated thyristor $Th_1$. The cathodes of the diodes $dr_1$ and $dr_2$ are connected together and to the gate of the thyristor, which is P-type. In the case of a N-type thyristor, the point Y would be connected to the thyristor anode, and the diodes $dr_1$ and $dr_2$ would be reversed, their anodes being connected together and to the gate of the thyristor. Alternatively, the orientation of the diodes shown in FIG. 2a could be retained, connecting point Y to the gate and the common cathodes of the diodes to the anode of the thyristor.

The value of capacitance $C_{1a}$ is so chosen that the parallel circuit it forms with winding M is tuned to the frequency of the control signals supplied by the generator G (See FIG. 1).

Figure 2B:
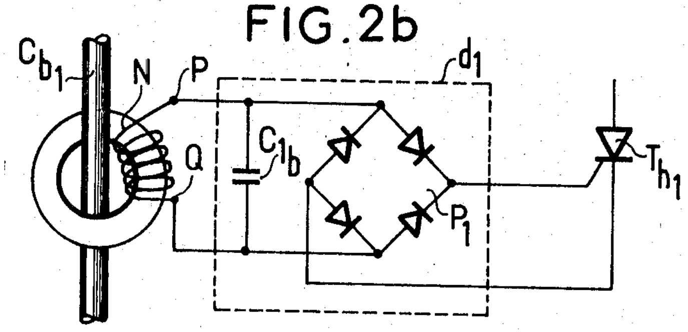

FIG. 2b shows a second form of rectifier circuit $d$. The winding of the control transformer N is not center-tapped; the ends of the winding P and Q are shunted by a capacitance $C_{1b}$ and are connected to opposite corners of a bridge rectifier $P_1$. The other corners of the bridge rectifier $P_1$ are connected to the gate and cathode of the thyristor $Th_1$, and provide the rectified control signal for the thyristor. In the case of P-type thyristor, the positive and negative terminals of the rectifier bridge are connected to the gate and cathode respectively, and in the case of a N-type thyristor, the positive and negative terminals are connected to the anode and the gate respectively.

The secondary circuit of the transformer $Tc_1$, being tuned to the frequency supplied by the generator G, behaves as a resistance at that frequency. If $\rho$ is the turns ratio of the transformer $Tc_1$ the resistance R of this circuit at the generator frequency is equivalent to a resistance $P^2R$ in series with the primary winding, and thus with the cable $Cb_1$. As there are $m$ rectifier circuits D, arranged in series along the cable $Cb_1$, the total equivalent resistance in series with the cable is $mp^2R$ which will hereafter be referred to as $r$. As the modules $D_1$ to $D_n$ (see FIG. 1) are identical, this resistance $r$ appears in series with each of the cables $Cb_1$ to $Cb_n$. Thus, the secondary winding $B_n$ of section transformer $T_n$ is effectively connected to a capacitance $Cs_n$ in series with the resistance $r$, neglecting the resistance of the cable $Cb_n$.

As this circuit is tuned to the generator frequency, it behaves like a resistance $r$. If the transformation ratio of the transformer $T_n$ to $T_1$ is unity, the resistance of the secondary circuit of transformer $T_n$ is equivalent to the resistance $r$ in the primary circuit, considered as being in series with the primary winding. The secondary winding of the transformer $I_{n-1}$ thus operates into the capacitance $CS_{n-1}$ in series with a first resistance $r$, from module $D_{n-1}$, and a second resistance r from the secondary circuit of the transformer $T_n$. This tuned circuit thus behaves as a resistance $2r$, and the equivalent resistance in series with the primary winding of transformer $T_{n-1}$ is $2r$.

Each secondary winding of the transformers $T_1$–$T_n$ is effectively coupled to a resistance $r$, and the secondary winding $B_1$ of the transformer $T_1$ is loaded by a resistance $nr$, $n$ being the number of sections in the column of thyristors. The generator load is thus equivalent to $nr$. In this analysis, the resistances of the cables Cb have been neglected, together with the resistances of the primary and secondary windings of the various transformers T. In practice, these resistances will be taken into account, but the overall analysis remains valid.

Thus, a signal from the generator G modulated by the control source SC will be applied simultaneously to all the thyristors of the column. This system also has an advantage in that it can continue to operate in the event of failure of one thyristor in a section if the other thyristors can withstand the total voltage of the section. Thanks to the coupling by the individual transformers between each thyristor and the control source, failure of one thyristor results in a limited variation in the current in the corresponding cable Cb.

Figure 3:
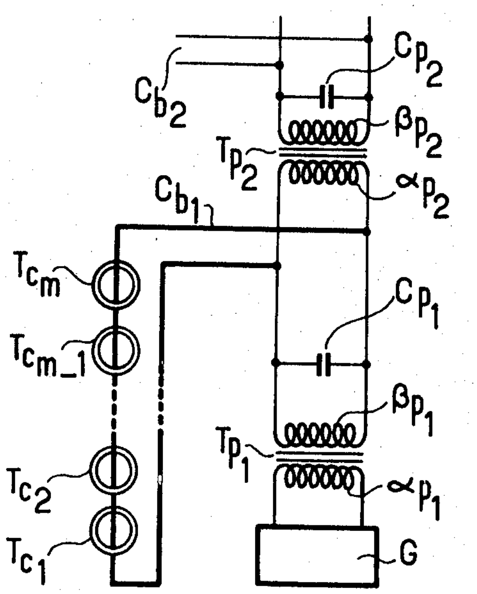
FIG. 3 shows a modification of the control circuitry shown in FIG. 1.

FIG. 3 shows a modification of the circuitry shown in FIG. 1. FIG. 3 shows only part of the circuitry of FIG. 1, including the first two section transformers, $T_1$ and $T_2$. It will be appreciated that the connections to the other transformers of the cascade are similarly arranged. The connections are essentially parallel as opposed to the series connections of FIG. 1, and the circuit components are distinguished by the suffix *p*.

The cable $Cb_1$ of the first section is connected in parallel across the secondary winding $\beta_{p1}$ of the first section transformer $T_p1$. A capacitance $C_{p1}$ also shunts this secondary winding which is connected directly in parallel with the primary winding $\alpha p2$ of the next section transformer $Tp_2$ of the cascade. The secondary winding of this second section transformer is shunted by a capacitance $Cp_2$ and cable $Cb_2$. The primary winding of the first section transformer $Tp_1$ is supplied by a generator G. The parallel circuit formed by the cable Cb, capacitance Cp, and secondary winding $\beta p$ of each section, together with the primary winding $\alpha p$ of the succeeding section is tuned to the generator frequency.

Figure 4:
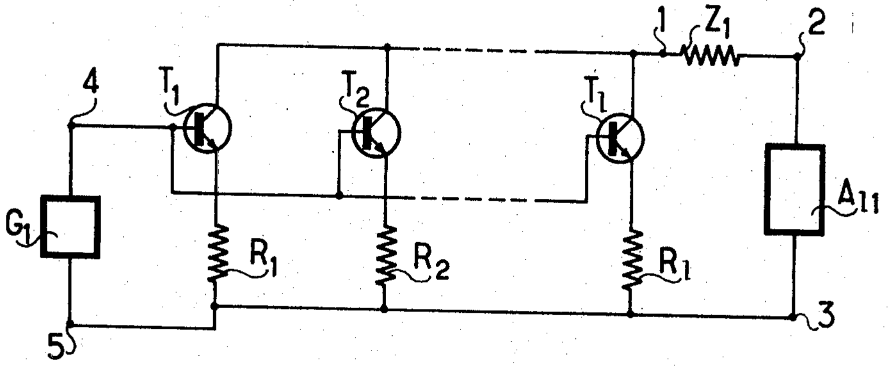
FIG. 4 shows a well-known parallel connected assembly of transistors.

FIG. 4 shows a known parallel-connected assembly of NPN transistors $T_1$ to $T_1$. The collectors of all transistors are connected to a common terminal 1. Each transistor has an emitter resistance $R_1$ to $R_1$ respectively, the ends of the resistances remote from the emitters being connected to a common terminal 3. The bases of the transistors are connected to a common point 4. A load $Z_1$ is connected between the point 1 and a point 2, and a voltage supply $A_{11}$ is connected between the points 2 and 3. A control signal source $G_1$ is connected between the points 4 and 5, the latter being connected directly to the point 3.

Figure 5:
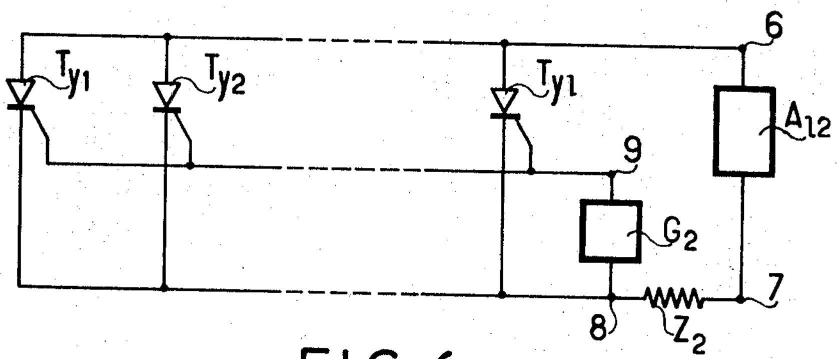
FIG. 5 shows a well-known parallel connected assembly of thyristors.

FIG. 5 shows a well known parallel-connected assembly of thyristors $T_{y1}$ to $T_{y1}$. Their anodes are connected together to a common point 6 and their cathodes are connected together to a common point 8. Their gates are connected together to a common point 9, and the control signal source $G_2$ is connected between the points 8 and 9. An alternating voltage source $A_{12}$ is connected between the point 6 and a point 7, and a load $Z_2$ is connected between the points 7 and 8.

With such a thyristor assembly, it is necessary to ensure a simultaneous firing of all thyristors, in order to avoid overloads. This condition must also be observed in series-connected assemblies, and in series or parallel connected assemblies of transistors.

In the case of thyristors, the alternating voltage supply is generally at a frequency of 50 Hz., and generally the repetition frequency of control signals applied to the gates is equal to this frequency of the alternating voltage source. With thyristors supplied by a direct current source, the repetition frequency of the control signals depends on the particular application. The control signals are generally pulses with a duration of a few tens or hundreds of microseconds. The connections between the control signal source and the gates of the thyristors introduce, as with transistor assemblies, stray capacitances and inductances which dephase the control signals from one gate to another. This results in staggered firing of the thyristors, with consequent voltage overload of the thyristors which are fired first. Direct parallel control of semiconductor devices has a disadvantage in that a failure in the control circuit of one device can put the whole assembly out of service; for example, if in a P-type thyristor the gate becomes short circuited to the cathode, all the gates connected in parallel with it are also short circuited.

FIG. 6*a* shows a parallel-connected assembly of transistors with a new form of control circuitry. The elements of the circuit bearing the same references as elements of FIG. 4 fulfill the same function. The transistors $T_1$ to $T_1$ are arranged in pairs. One such pair consists of the transistors $T_1$ and $T_2$. With each pair is associated a control transformer Tca, $Tca_1$ in the case of transistors $T_1$ and $T_2$. Each control transformer consists of a toroidal ferrite core carrying a winding, $E_1$ in the case of the transistor pair under consideration. This winding is shunted by a capacitance $Ca_1$, and is connected between the common bases of transistors $T_1$ and $T_2$ and the point 3. A cable Cb threads the closed magnetic circuit of all the control transformers Tca. A capacitance C is connected in series with the cable Cb between points 4 and 5. A control signal generator $G_1$ is also connected between the points 4 and 5. Each pair of transistors constitutes a sub-assembly of the overall assembly.

The secondary winding $E_1$ is tuned to the generator frequency by means of the capacitance $Ca_1$. The circuit formed by the capacitance C and the cable Cb is also tuned to the generator frequency.

In this assembly, failure of one of a pair of transistors, for example by an emitter-to-base short circuit, necessarily puts the other transistor of the pair out of service, since the control signal is removed.

FIG. 6*b* shows a modification of the circuitry of FIG. 6*a*. The parallel-connected assembly of transistors is also arranged in sub-assemblies each constituting a pair of transistors and each provided with a control transformer, one of these transformers being shown as $Tcb_1$. Each control transformer has two windings $E_{S1}$ and $E_{S2}$, one for each transistor of the pair, and each winding is separately tuned to the generator frequency by a shunt capacitance $C_{b1}$ and $C_{b2}$ respectively. Each winding is connected between the base of the respective transistor and the common point 3 (not shown in FIG. 6*b*).

FIG. 6*c* shows a further modification, wherein each pair of transistors is provided with a pair of control transformers, $T_{CC1}$ and $T_{CC2}$ in the case of the transistor pair $T_1$ and $T_2$. Each control transformer has a winding, $E_{S3}$ and $E_{S4}$ respectively, shunted by a respective capacitance $C_{C1}$ and $C_{C2}$, and each winding is connected between the base of the respective transistor and the common point 3 (not shown in FIG. 6C). With this arrangement, control of the two transistors are independent of one another, and failure of one transistor is practically without effect on the others. In this arrangement, each sub-assembly comprises a single transistor.

FIG. 7 shows a parallel-connected assembly of thyristors with a new form of control circuitry. The assembly is divided in sub-assemblies each comprising one thyristor with an associated control transformer. One such thyristor is shown at $T_{y1}$ with its associated control transformer $Tc_1$. The elements bearing the same reference as elements of FIG. 5 fulfill the same functions.

The closed magnetic circuits of all the control transformers $Tc_1$ to $Tc_1$ are threaded by a cable $C_{by}$ connected in series with a capacitance $C_{12}$ across the terminals 10 and 11 of a control signal source $G_2$. Each control transformer has a winding connected to the input of a rectifier circuit D, which is suitably as shown in FIG. 2*b*. The outputs of each rectifier circuit are connected between the gate and cathode of the corresponding thyristor.

With this arrangement, each sub-assembly comprising a single rectifier circuit and a single control transformer, the effects on the other thyristors of failure of one thyristor of the assembly is negligible. It is, however, possible for each rectifier circuit D to control the operation of more than one thyristor, and each control transformer could be provided with more than one winding, each connected to one rectifier circuit controlling one or more thyristors.

FIG. 8 shows an assembly of transistors in which two parallel-connected assemblies $TR_1$ and $TR_2$ are connected in series to a common source of control signals $G_1$. Each parallel-connected assembly, comprises npn transistors $T_1$ through $T_1$ as shown in FIG. 6*a*, 6*b* or 6*c*. Assembly $TR_1$ has terminals *a* and *b* for controlling its transistors, and between which the cable threading the magnetic circuits of the control transformers ic connected. Assembly $TR_2$ has corresponding terminals *c* and *d*. By connecting terminals *b* and *c* together, the two control cables are connected in series, forming a single cable Cb running from terminal *a* to *d*. A capacitance C is connected in series with this cable $C_b$ between terminals 4 and 5 of control signal source $G_1$.

Tuned circuits $C_{01}$ and $C_{03}$ are associated with assemblies $TR_1$ and $TR_2$ respectively each consisting of a tapped coil shunted by a capacitance. In each circuit, the tap is connected to that point of the assembly TR corresponding to the point referenced 3 in FIG. 6*a*. The ends of the coils nearer to the taps are connected together and to one end of a filter choke L whose other end is connected to one output terminal of a direct current source $A_1$. The other output terminal of source $A_1$ is connected to a point at ground or effective ground potential, as are the collectors of all transistors in assembly $TR_1$ and the emitters of assembly $TR_2$. A capacitance $C_{sh}$ shunts the source $A_1$ and inductance L.

Parallel tuned circuits $C_{02}$ and $C_{04}$ are inductively coupled to circuits $C_{01}$ and $C_{03}$ respectively, and are connected in series between terminals 80 and 81. A load (not shown) is connected between terminals 80 and 81.

It is equally possible for the tuned circuits $C_{02}$ and $C_{04}$ to be connected in parallel and shunted by the load, in which case all the transistors of both assemblies $TR_1$ and $TR_2$ are connected in parallel.

Thus it is possible, using basic assemblies such as $TR_1$ and $TR_2$, with coupled tuned circuits $C_{01}$ and $C_{02}$ to construct series, parallel or series-parallel assemblies.

The series-connection of the assemblies $TR_1$ and $TR_2$ ensures simultaneous control of all the transistors which would not be necessarily the case were the assemblies simply connected in parallel by linking terminals *a* and *c* and *b* and *d*.

It will be appreciated that while in the various embodiments just described by way of example, the various tuned circuits are all tuned to a single control frequency provided by the control signal generator, it is possible for the generator to provide a range of control frequencies, and for different parts of the control circuitry to be tuned to different control frequencies. In this way, different parts of the semi-ocnductor device assembly may be controlled independently of the others. The variation in tuning is conveniently obtained by changing the capacitance values shunting the windings of the control transformers, and each control transformer may be provided with a selection of capacitance values selected by a switching arrangement so that the control frequency of the corresponding sub-assembly can be readily altered to suit different applications.

The semi-conductor device assemblies just described which are parallel-connected, being shown in FIGS. 6, 7 and 8, find numerous applications, for example as power amplifiers of the signal provided by the generator $G_1$ or $G_2$, or as power stages in high frequency generators for use in induction furnaces for example.

Although the present invention has been described with reference to several embodiments, it is to be understood that the scope of the invention is not limited to the specific details thereof, but is susceptible of numerous changes and modifications as would be apparent to one with normal skill in the pertinent technology.

What we claim is:

1. An arrangement for controlling simultaneously the operation of an assembly of semi-conductor devices, comprising generator means for providing sinusoidal control signals at pre-determined control frequency, and control circuit means supplied with the control signals from said generator means and being at least in part tuned to said predetermined control frequency for supplying said control signals simultaneously to all of the semi-conductor devices connected to that part of said control circuit means tuned to said predetermined control frequency.

2. A control arrangement as claimed in claim 1, wherein the predetermined control frequency is one of a range of predetermined control frequencies at each of which said generator means can provide control signals.

3. A control arrangement as claimed in claim 1, the assembly of semi-conductor devices comprising a number of sub-assemblies, and wherein said control circuit means includes a control circuit associated with each sub-assembly, each such sub-assembly control circuit being tuned to a predetermined control frequency and being connected to apply a control signal from said generator means at the frequency to which it is tuned simultaneously to all of the semi-conductor devices of the associated sub-assembly.

4. A control arrangement as claimed in claim 3, wherein said control circuit means comprises a series-connected cascade of section transformers, a primary winding of the first transformer being connected to said generator means to receive said control signals, and primary windings of successive section transformers of the cascade being connected to the secondary winding of the preceding section transformer, so that all section transformers receive the control signal, one section transformer being associated with each sub-assembly and connected to the control circuit of that sub-assembly.

5. A control arrangement as claimed in claim 4, wherein each sub-assembly control circuit save one includes at least one control transformer, an electric cable threading the magnetic circuit of the control transformer, and a capacitance connected in series with the cable, the secondary winding of the associated section transformer and the primary winding of the succeeding section transformer, said one sub-assembly control circuit being that associated with the final section transformer of the cascade and which includes a control transformer, an electric cable threading the magnetic circuit of the control transformer and a capacitance connected in series with the cable and the secondary winding of the final section transformer of the cascade.

6. A control arrangement as claimed in claim 4, wherein each sub-assembly control circuit includes at least one control transformer, an electric cable threading the magnetic circuit of the control transformer and a capacitance, the cable and capacitance being connected in parallel with the secondary winding of the associated section transformer.

7. A control arrangement as claimed in claim 3, wherein each sub-assembly control circuit includes at least one control transformer, an electric cable threading the magnetic circuit of all control transformers, the cable of of all sub-assembly control circuits being connected in series with a capacitance across the generator output to constitute said control circuit means.

8. The control arrangement as claimed in claim 7, wherein each sub-assembly control circuit includes a single control transformer having a separate secondary winding for each semi-conductor device of the sub-assembly.

9. A control arrangement as claimed in claim 7, wherein each sub-assembly control circuit includes at least two control transformers each having a separate secondary winding for at least one semi-conductor device of the sub-assembly, the magnetic circuits of said control transformers being threaded by a common electric cable.

10. A control arrangement as claimed in claim 8, wherein each sub-assembly comprises a single semi-conductor device.

11. A control arrangement as claimed in claim 10, wherein each control transformer has its secondary winding tuned to a predetermined control frequency.

12. A control arrangement as claimed in claim 11, wherein each secondary winding of each control transformer is connected to the input of a respective rectifier circuit.

13. A control arrangement as claimed in claim 12, wherein the rectifier circuit comprises four semi-conductor rectifier diodes connected in a bridge circuit.

14. A control arrangement as claimed in claim 12, wherein each secondary winding of each control transformer is center-tapped and the associated rectifier circuit comprises a pair of semi-conductor rectifier diodes having their first electrodes connected together to a first output terminal of the rectifier circuit and their second electrodes connected to respective ends of the secondary winding, the center tap being connected to a second rectifier circuit output terminal.

15. A control arrangement as claimed in claim 3, wherein the frequency of said generator means is between 0.1 and 10 MHz.

* * * * *